The filled cone to the access opening of the machine.

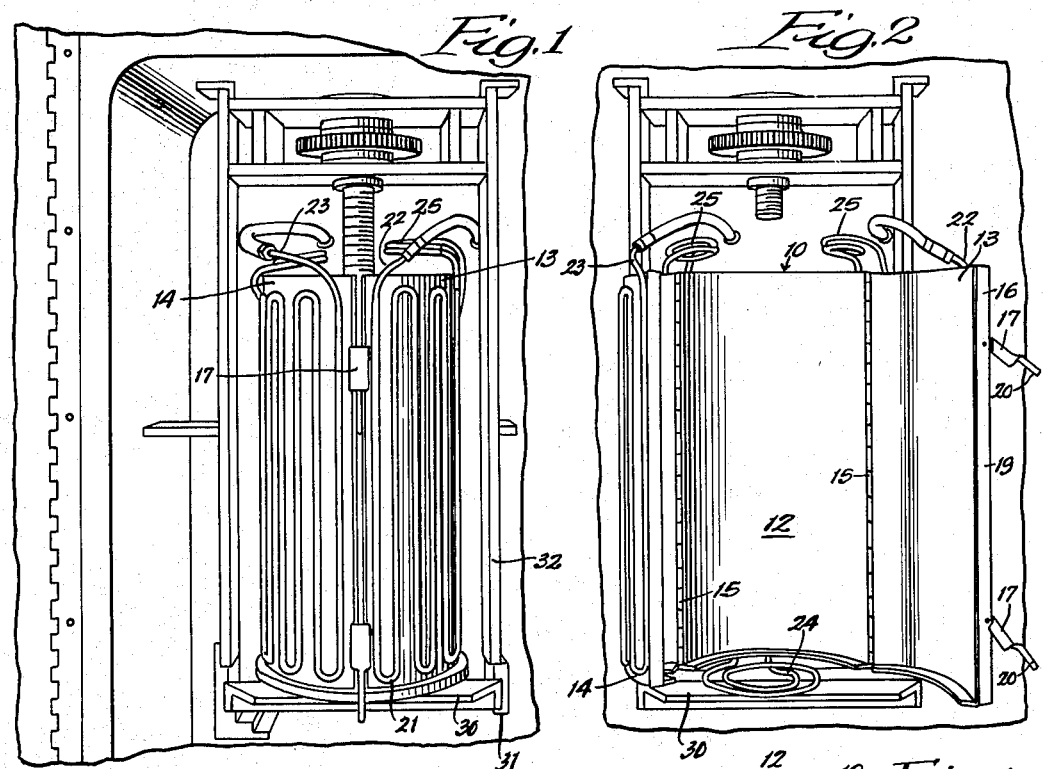
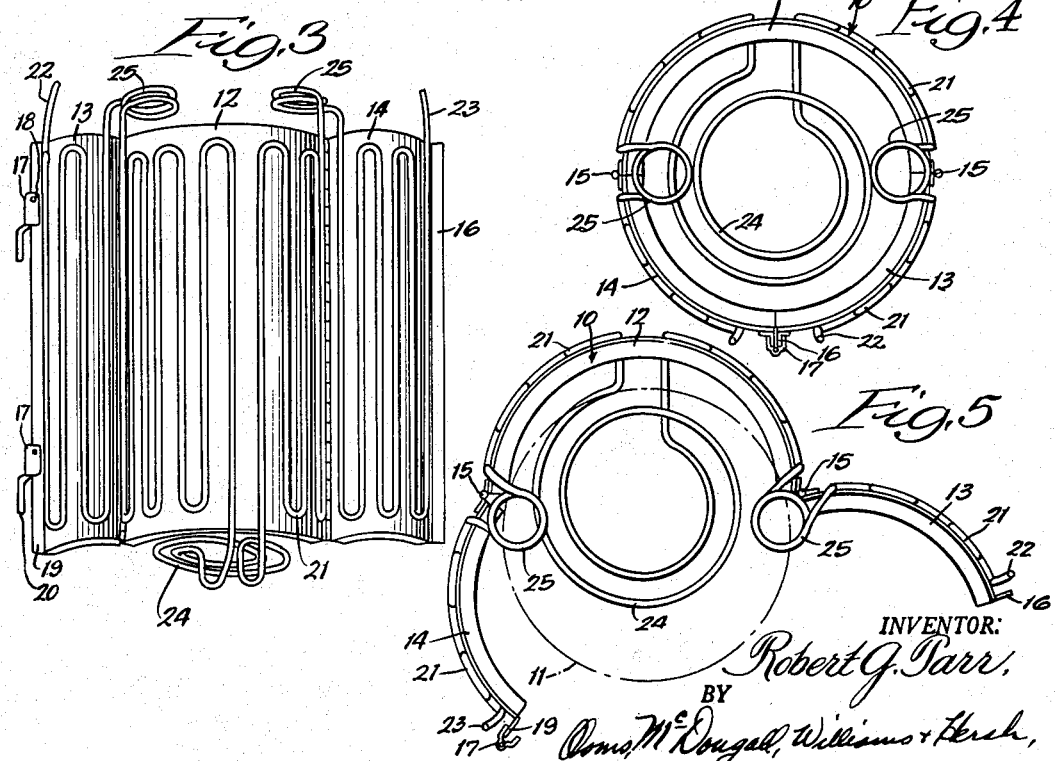

To the present, use has been made of a tubular cylinder mounted upon a saddle for tilting movement from a normal upright position to an inclined position, to enable easier access to the interior thereof for cleaning and for replacement of the bulk container when empty. The construction required for support of the cylinder for movement between upright and tilted position increases the cost and the space required for the machine and unnecessarily complicates the operation thereof.

United States Patent Office 2,742,268
Patented Apr. 17, 1956

2,742,268

REFRIGERATING JACKET FOR CONFECTION VENDING MACHINE

Robert G. Tarr, Villa Park, Ill.

Application December 3, 1953, Serial No. 395,953

4 Claims. (Cl. 257—14)

This invention relates to a machine for vending ice cream and the like frozen confections from bulk containers and it relates more particularly to an improvement in the storage compartment for a bulk container from which the ice cream or other frozen confection is dispensed, with particular reference to a machine of the type described in my copending application Ser. No. 81,120, filed March 21, 1949, and entitled "Ice Cream Cone Dispenser," of which this is a continuation-in-part.

Briefly described, the dispensing machine of the aforementioned copending application comprises a storage unit for the bulk container from which the ice cream or other frozen confection is dispensed in increments of predetermined shape upon purchase, a supply unit for cones, dishes, or other containers with dispensing means for advancing the container into position for receiving the increment of frozen confection upon delivery from the bulk container, and a delivery unit which embodies mechanism for the separation of an increment of frozen confection from the bulk container for deposition into the cone and then for forwarding the ice cream cone or the like filled conatiner, to an access opening from which it may be removed by the purchaser.

Since the improvement herein resides chiefly in the storage compartment for the bulk container, description will be made briefly of the construction and operation of the elements therein. Suffice it to say that the bulk container, generally of a circular cross-section, is housed within a cylinder that is open at the top and at the bottom, and is mounted within a refrigerated space. A piston is operatively connected to power means for positive displacement into and out of the cylinder through the upper end for the generation and control of pressure on the frozen confections within the container, while a conical member communicates with the lower end of the cylinder and terminates in a cylindrical section of small dimension in which a cup member is positioned to receive the ice cream or other frozen confection upon extrusion through the cylindrical member and to form a ball thereof.

The cup member is supported on one end of a carriage mounted for rocking movement between a normal raised position and a depressed or operated position in response to the pressure existing in the frozen confection when the cup member has become filled. Responsive to such rocking movement of the carriage upon filling of the cup, the piston operating means, initiated in response to the insertion of coins in the amounts for a purchase, is inactivated and reversed a short distance to raise the piston and relieve pressure. Substantially simultaneously the cup is rotated through an angle of about 180 degrees to an inverted position wherein it dwells for a time sufficient to enable an arcuate knife blade to reciprocate back and forth over the surface of the cup to release the ball of ice cream formed therein. The released increment of the frozen confection falls by gravity into the open end of a cone or dish positioned in advance immediately below the cup and supported by mechanism which delivers the filled cone to the access opening of the machine.

It is an object of this invention to produce a machine of the type described in which it is unnecessary to tilt the casing for access to the interior thereof for cleaning, or for removal and replacement of the bulk container, which enables the bulk container to be removed and replaced in a very simple and efficient manner, which provides a cold wall substantially throughout its surfaces in contact with the bulk container for more efficient refrigeration without interference with the flexibility of the casing in use, and which is rigidly mounted in the machine to enable a more sturdy construction with utilization of less materials and space, thereby to improve the efficiency and ease of operation of the machine and reduce the cost and space requirements thereof.

These and other objects and advantages of this invention will hereinafter appear and for purposes of illustration, but not of limitation, an embodiment of the invention is shown in the accompanying drawing in which—

Figure 1 is a perspective elevational view of the housing for the bulk container, schematically illustrated as being mounted in a machine of the type described;

Figure 2 is a front elevational view of the storage compartment shown in Figure 1 in open position;

Figure 3 is a rear elevational view of the structure shown in Figure 2;

Figure 4 is a top end view of the structure shown in Figure 2 in closed position, and Figure 5 is a top end view of the structure in open position.

In accordance with the practice of this invention, the cylindrical housing 10 for the bulk container 11 is formed of three parts comprising an elongated semi-cylindrical section 12 and a pair of quarter sections 13 and 14 having substantially the same lengths, and which together form a cylinder which is open at the top and at the bottom and which has a cross-sectional diameter and length slightly greater than the corresponding diameter of the bulk container adapted to be housed therein.

The semi-cylindrical section 12 is rigidly supported within the refrigerated space upon cross bars 30 having ends which rest on stepped plates 31 attached to the lower end of upright frame members 32 between which the members forming the cylinder are positioned. The cross bars beneath the semi-cylindrical section further support the tubular container when in position of use within the housing. One quarter section 13 is hingedly mounted on a side edge on the semi-cylindrical section, while the other quarter section 14 is hingedly mounted, as at 15, on the other side edge of the semi-cylindrical section to permit swinging movement of the quarter section to between open and closed position. In closed position, as illustrated in Figure 4, the elements form a cylindrical housing and, when in open position, full access is available to the interior of the housing for removal of frost and other materials adhered to the walls thereof, and for the removal and replacement of the bulk container 11.

Various means may be employed for mounting the quarter sections in closed position to conceal the bulk container therein. One such means, as illustrated, comprises a flange 16 extending outwardly normally to the free edge of one quarter section, and one or more channel elements 17 pivotally mounted on a pin 18 on a similarly outwardly extending flange 19 on the other quarter section, with a handle 20 extending in a direction away from the pivot for rocking movement between latching and unlatching position. When the quarter sections 13 and 14 are closed to form the completed cylinder, the flanges abut one another and are latched in abutting relation by the channel members 17 when rocked to latching position, as illustrated in Figure 4.

Temperature conditions for maintaining the confection in the desired refrigerated condition within the housing are achieved by flexible tubing 21 formed of copper, aluminum, or other highly conductive material, which is looped back and forth in closely spaced apart relation over the surface of the cylindrical sections to which they are bonded, as by welding, brazing, or the like. The inlet end 22 and the outlet end 23 of the tubing extend from the outer end respectively of the quarter sections 14 and 13, and are connected to conduits leading from the supply of refrigerant fluid. An intermediate portion of the tubing extends downwardly from the fixed semi-cylindrical section 12 and is formed into spirals 24 which is turned horizontally to extend beneath the open end of the cylinder and surrounds the area from which the ice cream is extruded into the ball-forming cup.

Between the hinged quarters and semi-cylindrical sections, intermediate lengths of the tubing extend upwardly above the plates and then are turned horizontally and formed into two or more loops 25, to provide flexibility sufficient to enable the quarter sections to be swung into open and closed positions without bending the tubing in a manner which might cause fatigue or breakage.

It will be understood that the plates forming the semi-cylindrical and quarter sections may be internally refrigerated by suitable conduits or passages for the transmission of refrigerant rather than to rely upon transfer of cold from tubing positioned in surface contact with their outer walls. It will be apparent also that the refrigeration of the plates, as described, may function to cool the remaining space in the machine sufficiently to prevent excessive melting of the confection from the time it is dispensed from the container until delivery to the purchaser. In fact, it has been found desirable from the standpoint of release of a formed ball of ice cream or the like, and from the standpoint of the operation of the cone dispenser and delivery unit as well as for improvement of the freshness of the cones, that the elements outside the housing for the bulk container be at a higher temperature.

It will be understood that the plates forming the sections of the housing may vary somewhat in the arcuate dimensions described such as to be greater or smaller than the semi-cylindrical or quarter sections, but it is desirable, when in open position, that the opening formed be sufficient for ready access to the interior of the housing for removal and insertion of the bulk containers.

By way of illustration, in a machine adapted to use a standard five gallon cylinder of ice cream, having a diameter of 9⅛ inches and a length of about 17¾ inches, the parts adapted to form the cylindrical housing should form an inside diameter of 9¼ inches and form a cylinder about 18 inches in length.

It will be understood that changes may be made in the details of construction, arrangement and operation without departing from the spirit of the invention as specifically defined in the following claims.

I claim:

1. In a machine for dispensing frozen confections from bulk containers, a frame, a bulk container of cylindrical shape supported on said frame and having an outlet opening in its bottom wall through which the frozen confection is extruded during dispensing operations, a housing surrounding the bulk container comprising arcuate elongate sections including a substantially semi-cylindrical section fixed to the frame of the machine and substantially quarter sections pivoted upon the lateral edges of said fixed semi-cylindrical section for rocking movement between an open position for access to the interior thereof and a closed position to form a cylinder which is open at the top and at the bottom and is dimensioned to receive the bulk container in fitting relation therein, means on the free edge portions of the substantially quarter sections for latching one to the other in closed position, a length of tubing of heat-conductive material, for passage of refrigerant therethrough, fixed in contacting heat exchange relation to the outer walls of each of the sections of the housing and interconnected by continuous spiraled portions offset from the walls of the sections at their pivots to enable rocking movement of the quarter sections between open and closed positions and having an intermediate portion extending perpendicularly across the open end at the underside of the housing for refrigeration of the bulk container adjacent its outlet opening.

2. A machine for dispensing balls of ice cream as claimed in claim 1 in which the cylindrical sections pivoted one upon the other to form the cylindrical housing are dimensioned to have a length corresponding to that of the bulk container.

3. A machine for dispensing balls of ice cream as claimed in claim 1 in which the framework rigid with the machine comprises spaced upright members between which the arcuate sections are disposed and a cross bar upon which the arcuate sections and the container rest when in position of use.

4. A machine as claimed in claim 1 in which portions of the tubing joining the pivoted arcuate sections extend outwardly therefrom and are formed into spirals which are turned substantially perpendicularly to the axis of the pivot to provide a resilient connection.

References Cited in the file of this patent

UNITED STATES PATENTS

| | | |
|---|---|---|
| D. 153,797 | Heim | May 7, 1949 |
| 2,629,988 | Lee | Mar. 3, 1953 |